(12) United States Patent
Zhang

(10) Patent No.: US 12,691,798 B2
(45) Date of Patent: Jul. 28, 2026

(54) JOINT MECHANISM AND CHILD SAFETY SEAT

(71) Applicant: WONDERLAND SWITZERLAND AG, Steinhausen (CH)

(72) Inventor: Daliang Zhang, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 10 days.

(21) Appl. No.: 18/694,539

(22) PCT Filed: Sep. 22, 2022

(86) PCT No.: PCT/EP2022/076386
§ 371 (c)(1),
(2) Date: Mar. 22, 2024

(87) PCT Pub. No.: WO2023/046838
PCT Pub. Date: Mar. 30, 2023

(65) Prior Publication Data
US 2024/0391366 A1 Nov. 28, 2024

(30) Foreign Application Priority Data

Sep. 22, 2021 (CN) .......................... 202111108106.X

(51) Int. Cl.
*B60N 2/26* (2006.01)
*B60N 2/28* (2006.01)
(52) U.S. Cl.
CPC ................. *B60N 2/26* (2013.01); *B60N 2/28* (2013.01); *B60N 2/2816* (2023.08)
(58) Field of Classification Search
CPC ..... B62B 9/14; Y10T 403/59; Y10T 403/591; Y10T 403/599; F16B 21/16; H01R 13/5213
See application file for complete search history.

(56) References Cited

U.S. PATENT DOCUMENTS 5,522,669 A * 6/1996 Recker ................... F16D 1/116
403/328
6,764,133 B2 * 7/2004 Osato ...................... A47D 1/08
297/184.13
(Continued)

FOREIGN PATENT DOCUMENTS

CN 2618833 Y 6/2004
CN 100548739 C 10/2009
(Continued)

OTHER PUBLICATIONS

International Search Report issued in corresponding International Application No. PCT/EP2022/076386, dated Dec. 5, 2022, pp. 1-2, European Patent Office, Rijswijk, Netherlands.
(Continued)

*Primary Examiner* — Justin M Benedik
(74) *Attorney, Agent, or Firm* — HAUPTMAN HAM, LLP

(57) ABSTRACT
A joint structure includes: a fixing part, which is connected to a first object, and has a cylindrical fixing part side wall having an open end and a receiving end provided opposite to each other; an inserting part, which is connected to a second object, has a cylindrical inserting part side wall, and is inserted and sleeved into the fixing part side wall along an insertion direction through the open end; a closing member, which is provided inside the fixing part side wall, positioned between the receiving end of the fixing part and the inserting part, movable between the open end and the receiving end, and has a closing plate adjacent to the open end and is shaped corresponding to a cross-sectional shape of the fixing part side wall at the open end; a first elastic member, which exerts a force that biases the closing member toward the open end.

18 Claims, 22 Drawing Sheets

(56) References Cited

U.S. PATENT DOCUMENTS

| | | | | |
|---|---|---|---|---|
| 2003/0106976 A1* | 6/2003 | Then | B60N 3/101 | |
| | | | 248/311.2 | |
| 2010/0163088 A1* | 7/2010 | Zeng | B62B 9/14 | |
| | | | 135/96 | |
| 2020/0361348 A1* | 11/2020 | Mason | B60N 2/2845 | |
| 2021/0146809 A1 | 5/2021 | Cui | | |

FOREIGN PATENT DOCUMENTS

| | | | | | |
|---|---|---|---|---|---|
| CN | 101682143 | A | | 3/2010 | |
| CN | 201777288 | U | | 3/2011 | |
| CN | 201907547 | U | | 7/2011 | |
| CN | 202080319 | U | | 12/2011 | |
| CN | 202536846 | U | | 11/2012 | |
| CN | 101682143 | B | | 3/2013 | |
| CN | 203032422 | U | | 7/2013 | |
| CN | 103661553 | A | | 3/2014 | |
| CN | 104097545 | A | * | 10/2014 | B60N 2/2821 |
| CN | 102712269 | B | | 7/2015 | |
| CN | 105449446 | A | | 3/2016 | |
| CN | 205509117 | U | | 8/2016 | |
| CN | 104097545 | B | | 4/2017 | |
| CN | 206394687 | U | | 8/2017 | |
| CN | 206841219 | U | | 1/2018 | |
| CN | 207461824 | U | | 6/2018 | |
| CN | 108437860 | A | | 8/2018 | |
| CN | 108621882 | A | | 10/2018 | |
| CN | 208336611 | U | | 1/2019 | |
| CN | 208646952 | U | | 3/2019 | |
| CN | 210707587 | U | | 6/2020 | |
| CN | 111422110 | A | | 7/2020 | |
| CN | 211107641 | U | | 7/2020 | |
| CN | 211165558 | U | | 8/2020 | |
| CN | 211166558 | U | | 8/2020 | |
| CN | 111923796 | A | | 11/2020 | |
| CN | 212555952 | U | | 2/2021 | |
| EP | 3831649 | A1 | | 6/2021 | |
| GB | 2415368 | A | | 12/2005 | |
| GB | 2445628 | A | | 7/2008 | |
| JP | 58009815 | Y2 | | 2/1983 | |
| JP | H05027335 | Y | | 7/1993 | |
| JP | H06135266 | A | | 5/1994 | |
| JP | 2000071932 | A | | 3/2000 | |
| JP | 2002240603 | A | * | 8/2002 | |
| JP | 3127412 | U | | 11/2006 | |
| JP | 3127413 | U | | 11/2006 | |
| JP | 2007015597 | A | | 1/2007 | |
| JP | 2011183934 | A | | 9/2011 | |
| JP | 2016150654 | A | | 8/2016 | |
| JP | 2021079941 | A | | 5/2021 | |
| TW | I635002 | B | | 9/2018 | |
| WO | 2005113281 | A2 | | 12/2005 | |
| WO | 2015055846 | A1 | | 4/2015 | |
| WO | 2021098710 | A1 | | 5/2021 | |

OTHER PUBLICATIONS

Taiwan 1st Office Action issued in corresponding Taiwan Application No. 111135924, dated Jul. 18, 2023, pp. 1-4.

Chinese 1st Office Action issued in corresponding Chinese Application No. 2020114117374, dated Jan. 26, 2024, pp. 1-9.

Taiwan 1st Office Action issued in corresponding Taiwan Application No. 110145200, dated Sep. 12, 2022, pp. 1-8.

Taiwan 1st Office Action issued in corresponding Taiwan Application No. 112109123, dated Aug. 31, 2023, pp. 1-13.

Second Office Action issued in Chinese Patent Application No. 2020114117374; mailed May 31, 2024; 14 pgs.

First Office Action issued in Japanese Patent Application No. 2023-534243; mailed Jun. 18, 2024; 19 pgs.

First Office Action issued in Australia Patent Application No. 2021393787; mailed Jul. 15, 2024; 6 pgs.

Third Office Action in Corresponding Chinese Application No. 202011411737.4, dated Sep. 23, 2024; 16 pgs.

First Office Action in Corresponding European Application No. 21830419.4, dated Mar. 20, 2025; 11 pgs.

First Office Action in Corresponding European Application No. 22782524.7, dated Mar. 24, 2025; 9 pgs.

First Office Action in Corresponding Japanese Application No. 2024-518384, dated May 21, 2025; 6 pgs.

Non-Final Office Action in Corresponding U.S. Appl. No. 18/255,937, dated May 7, 2025; 37 pgs.

First Office Action in Corresponding Taiwan Application No. TW113128453, dated Dec. 30, 2024; 16 pgs.

First Office Action in Corresponding Taiwan Application No. 114116387, dated Jul. 22, 2025; 27 pgs.

* cited by examiner

200

100

300

170

130

120

JOINT MECHANISM AND CHILD SAFETY SEAT

This application is a National Stage application of PCT/EP2022/076386, entitled "Joint Mechanism and Child Safety Seat" and filed on Sep. 22, 2022, which claims the benefit of Chinese Application No. 202111108106.X, filed on Sep. 22, 2021, both of which are incorporated herein by reference in their entirety."

TECHNICAL FIELD

This disclosure relates to a joint mechanism and a child safety seat with the joint mechanism.

BACKGROUND

A child safety seat is a conventional device, in which children at different ages are allowed to sit. The child safety seat is designed for consideration of safety of the child in a vehicle, to restrain dangerous behaviors of the child during travelling and protect the child from being injured in the case of an accident such as a sudden collision.

The child safety seat in the prior art is generally not provided with a canopy, which is detrimental to use the child safety seat for example in a top-opened vehicle or outdoors. Even for child safety seat with a canopy, the canopy is usually designed to be fixed to the seat, and thus is not convenient to be removed.

SUMMARY

A joint structure according to the present disclosure for detachably joining a first object to a second object. The joint structure includes a fixing part connected to the first object, the fixing part having a cylindrical fixing part side wall, and the fixing part side wall having an open end and a receiving end provided opposite to each other; an inserting part connected to said second object, the inserting part having a cylindrical inserting part side wall, and the inserting part being inserted and sleeved into the fixing part side wall along an insertion direction through the open end, such that the second object is jointed to the first object; a closing member provided inside the fixing part side wall, positioned between the receiving end of the fixing part and the inserting part, and being movable between the open end and the receiving end; the closing member having a closing plate adjacent to the open end, and the closing plate being shaped corresponding to a cross-sectional shape of the fixing part side wall at the open end; a first elastic member provided between the closing member and the receiving end, for exerting a force that bias the closing member toward the open end, such that the closing member elastically abuts against the inserting part; wherein when the inserting part is not inserted into the fixing part, the closing member is biased to the open end by the first elastic member; and when the inserting part is inserted into the fixing part, the closing member is pushed to the receiving end by the inserting part and leaves the open end.

In one embodiment, a stopper is provided on an inner side of the fixing part side wall, and is positioned between the open end and the receiving end and protrudes inwardly from the inner side of the fixing part side wall; a protruding part is provided on an outer side of the inserting part side wall, and protrudes outwardly from the outer side of the inserting part side wall; when the inserting part is inserted into the fixing part, the protruding part travels over the stopper and abuts against the stopper from a side adjacent to the receiving end, to prevent disengagement of the inserting part from the fixing part.

In one embodiment, the stopper is formed in a circle along an inner circumference of the fixing part side wall, or is symmetrically provided on the inner circumference of the fixing part side wall in a discrete manner.

In one embodiment, the closing member is provided with a barb that extends from the closing plate toward the receiving end and has a hook portion protruding toward the fixing part side wall at a bottom end; and the barb is configured to abut against the stopper from the side adjacent to the receiving end to prevent the disengagement of the closing member from the fixing part when the closing member is biased to the open end by the first elastic member.

In one embodiment, a cross section of the fixing part side wall is substantially presented as a rectangle, and the stopper is provided on each of long sides and short sides of the rectangle; a plurality of protruding parts is provided on the inserting part side wall, and respectively correspond to the stoppers on the long sides and/or the short sides of the fixing part side wall; and the closing member has a plurality of barbs that are configured to correspond to the stoppers on the long sides and/or the short sides of the fixing part side wall.

In one embodiment, the protruding part extends on the inserting part side wall in a direction perpendicular to the insertion direction, and a slot parallel to the insertion direction is provided on the inserting part side wall at either end of the protruding part.

In one embodiment, the joint structure further includes a release button which is provided on the inserting part side wall and partially inserted in the inserting part; the release button is slidable between a locked position away from the inserting part and a release position close to the inserting part in a direction perpendicular to the insertion direction of the inserting part, to selectively lock the inserting part to the fixing part.

In one embodiment, the release button includes: a pushing portion protruding outwardly at a side away from the fixing part and perpendicular to the insertion direction of the inserting part; a locking portion protruding outwardly at a side away from the fixing part and perpendicular to the insertion direction of the inserting part, and is closer to the fixing part than the pushing portion; when the inserting part is inserted into the fixing part, the pushing portion remains outside the fixing part, and the locking portion is inserted into the fixing part and is snapped on an inner side of the stopper of the fixing part.

In one embodiment, the fixing part further has a fixing part edge that extends outwardly from an edge of the open end of the fixing part side wall; when the inserting part is not inserted into the fixing part, a closing plate of the closing member is substantially flush with the fixing part edge.

In one embodiment, in the insertion direction of the inserting part, a sum of lengths of the inserting part and the closing member is approximately equal to a length of the fixing part, such that the closing member abuts against the receiving end of the fixing part when the inserting part is inserted into the fixing part.

A child safety seat according to the present disclosure includes a seat body; a canopy configured to join to an upper part of the seat body; the joint structure according to the present disclosure, wherein the first object is the seat body and the second object is the canopy; the two joint structures are respectively provided on both sides of the seat body, and the receiving end of the fixing part is embedded into the seat body from a corresponding side surface of the seat body, and the open end of the fixing part is exposed out of a corresponding side surface of the seat body.

In one embodiment, the canopy includes a first canopy rod and a second canopy rod that are substantially U-shaped, the joint structure includes a first canopy rod fixing member and a second canopy rod fixing member, wherein the first canopy rod fixing member is fixed on the inserting part, and the second canopy rod fixing member is pivotally connected to the first canopy rod fixing member; two ends of the first canopy rod are fixedly connected to the corresponding first canopy rod fixing members of the two joint structures, respectively; and two ends of the second canopy rod are fixedly connected to the corresponding second canopy rod fixing members of the two joint structures, respectively, so that the second canopy rod is rotatable about an axis parallel to the insertion direction of the inserting part with respect to the first canopy rod.

BRIEF DESCRIPTION OF THE DRAWINGS

Embodiments of the present disclosure will be specifically described below in conjunction with accompanying drawings, in which.

Figure 1:
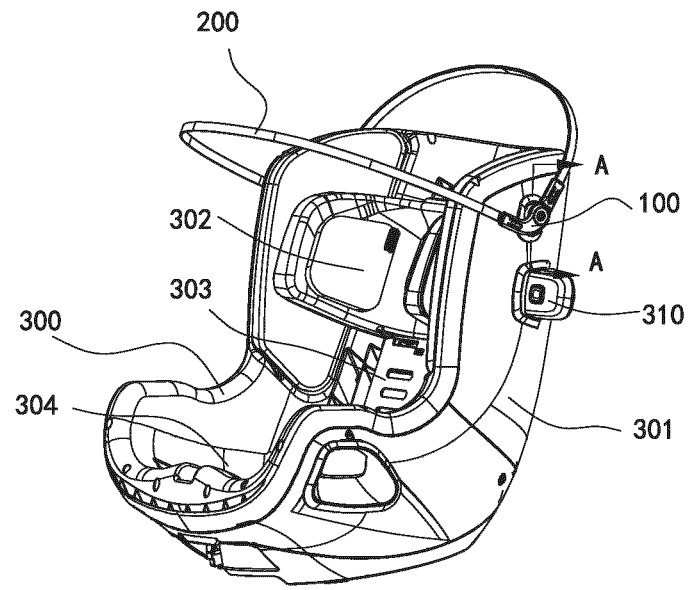
FIG. 1 is a perspective view showing a child safety seat according to the present disclosure, in which a state that a canopy rod is engaged to a seat body is shown.

The list of reference numerals is as follows:

100 Joint Structure
   110 Fixing Part
      111 Fixing Part Edge
      112 Fixing Part Side Wall
         1121 Open End
         1122 Receiving End
      114 Stopper
   120 Closing Member
      121 Closing Plate
      122 Barb
   130 Inserting Part
      131 Inserting Part Side Wall
      132 Protruding Part
      133 Slot
      134 Limiting Portion
   140 First Canopy Rod Fixing Member
      141 First Disc-Shaped Part
      142 First Canopy Rod Connection
      143 Receiving Space
      144 Positioning Groove
   150 Second Canopy Rod Fixing Member
      151 Second Disc-Shaped Part
      152 Second Canopy Rod Connection
      153 Rotating Part
      154 Positioning Protrusion
      155 Through Hole
   160 Cap
      161 First Elastic Member
      162 Second Elastic Member
      163 Third Elastic Member
      170 Release Button
      171 Pushing Portion
      172 Locking Portion
      173 Release Button Elastic Member Mount
200 Canopy
   210 First Canopy Rod
   220 Second Canopy Rod
300 Seat Body
   310 Protection Block
   301 Casing
   302 Headrest Portion
   303 Backrest Portion
   304 Seat Portion
   305 Receiving Chamber

DETAILED DESCRIPTION

The present disclosure is illustrated and described herein with reference to specific embodiments, the present disclosure should not be limiting portioned to the details as illustrated. More specifically, various modifications may be made to these details within equivalents of the claims but without departing from the present disclosure.

The descriptions of directions such as "front", "rear", "up" and "down" involved herein are merely for the convenience of understanding, and the present invention is not limiting portioned thereto, and can be adjusted according to actual situations. The present disclosure has been described in the typical embodiments as listed, the terms in use are exemplary and explanatory but not restrictive of the invention as claimed.

Figure 2:
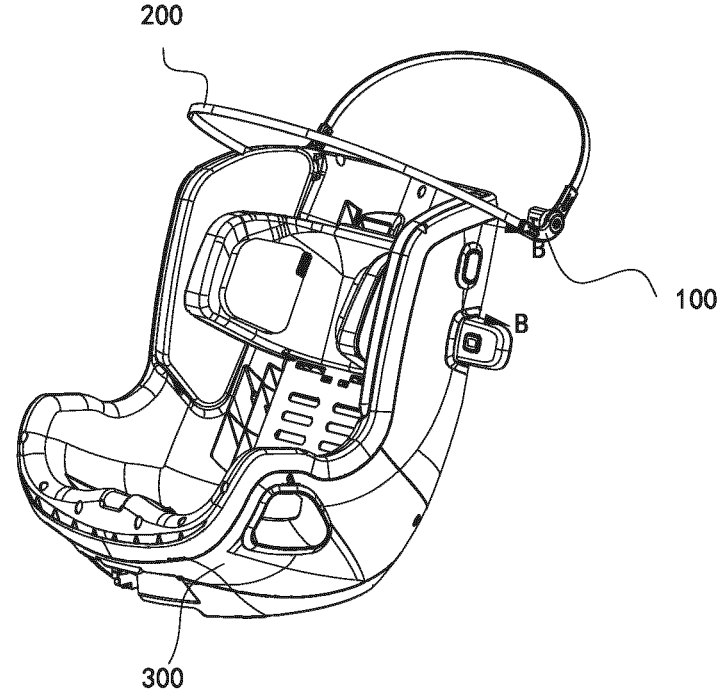
FIG. 2 is a perspective view showing a child safety seat according to the present disclosure, in which a state that the canopy rod is separated from the seat body is shown.
Figure 3:
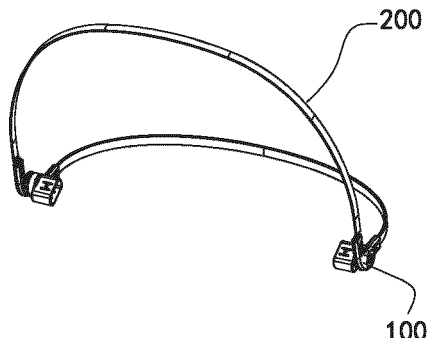
FIG. 3 shows a perspective view of a canopy of the child safety seat according to the present disclosure.
Figure 4A:
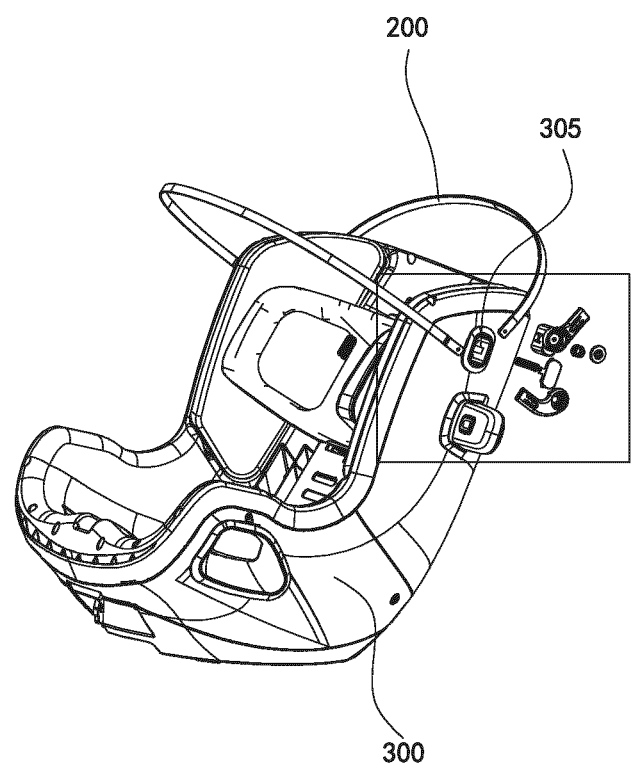
FIG. 4A shows a perspective view of a child safety seat according to the present disclosure, in which a joint structure is shown in an exploded view.

Referring to FIG. 1 to FIG. 3, a child safety seat according to the present disclosure is generally described. The child safety seat includes a seat body 300 that has a casing 301, a headrest portion 302, a backrest portion 303 and a seat portion 304. In addition, in this embodiment, a receiving chamber 305 is further provided on either side of the seat body 300 (see FIG. 4A). The receiving chambers 305 are preferably positioned on the casing 301 with respect to an upper edge of the headrest portion 302. In other embodiments, the receiving chamber 305 may also be positioned between positions of the casing 301 corresponding to the upper edge of the headrest portion 302 and an upper edge of the casing 301.

In other embodiments, a side impact protection block 310 is provided on either side of the seat body 300. In these embodiments, the receiving chambers 305 are positioned between the side impact protection blocks 310 and the upper edge of the casing 301, and the present disclosure is not limiting portioned thereto.

The child safety seat as disclosed in this embodiment further includes a canopy 200 and a joint structure 100 connecting the seat body 300 and the canopy 200. The canopy 200 has a canopy rod detachably joined to left and right sides of the seat body 300 through the joint structure 100 of the present disclosure. The joint structure 100 may be provided individually or symmetrically on the left and right sides of the seat body 300. The joint structure 100 is divided into two parts, one of which is a fixing part 110 embedded in the receiving chamber 305, and the other of which is an inserting part 130 connected to the canopy rod.

For convenience of observation, only two canopy rods of the canopy 200 are shown, and a canopy cloth installed on the canopy rods is not shown. It should be noted that although the canopy of the embodiments as shown in the figures includes two canopy rods, that is a first canopy rod 210 and a second canopy rod 220, which may be rotated relative to each other to fold the canopy 200 (described in detail later), the joint structure 100 of the present disclosure is applicable to canopy rods at any numbers, and to foldable or non-foldable canopy structures. The joint structure 100 of the present disclosure includes a design that allows two canopy rods to rotate relative to each other. However, the design is not necessary, and can be varied according to types of the canopies.

Components of the joint structure 100 according to the present disclosure will be briefly described with reference to FIGS. 4A-5B.

The joint structure 100 includes a fixing part 110, an inserting part 130, a closing member 120, a first canopy rod fixing member 140, a second canopy rod fixing member 150, a cap 160, a first elastic member 161, and a second elastic member 162. The fixing part 110 is embedded in the seat body 300. The inserting part 130 is connected to the canopy 200, and the inserting part 130 may be inserted into the fixing part 110 in order to assemble the canopy 200 to the seat body 300. The closing member 120 is positioned in the fixing part 110 for closing an opening of the fixing part 110 when the inserting part 130 is not inserted into the fixing part 110. The first canopy rod fixing member 140 and the second canopy rod fixing member 150 are connected to the inserting part 130, for connecting the first canopy rod 210 and the second canopy rod 220, respectively.

Figure 4B:
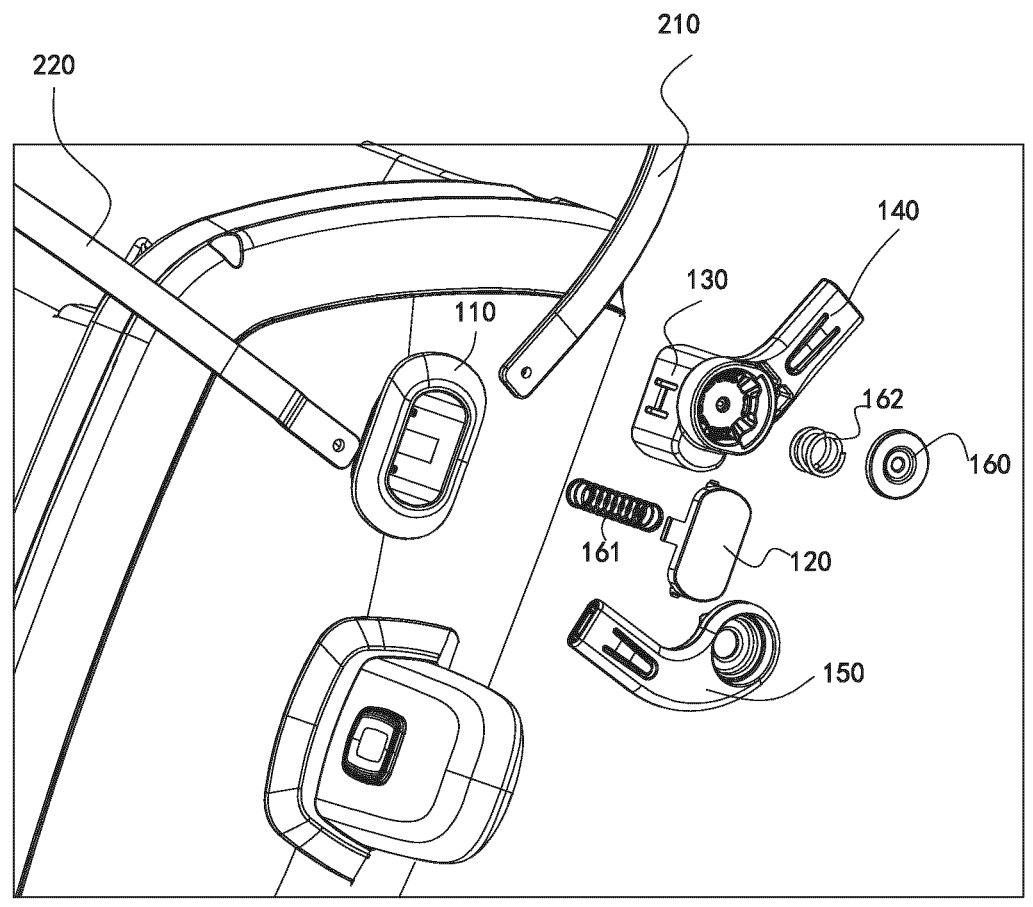
FIG. 4B is an enlarged view of a block portion of FIG. 4A.
Figure 5A:
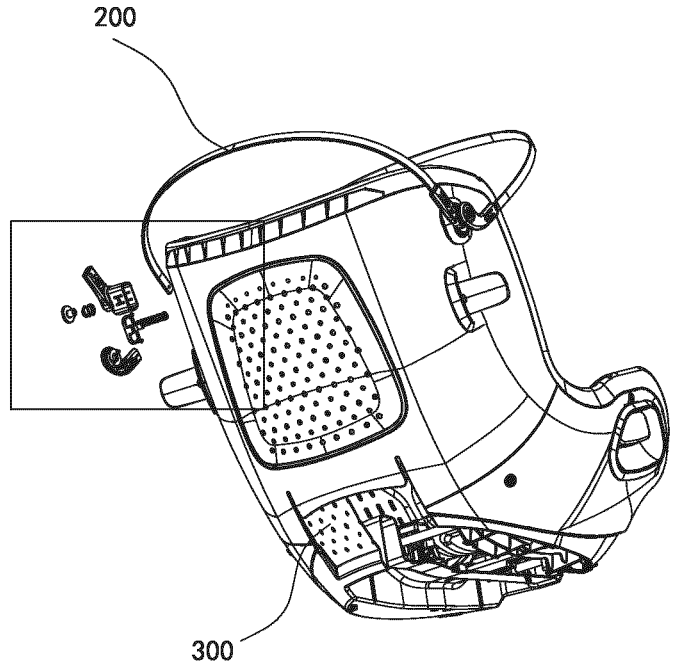
FIG. 5A is a perspective view of a child safety seat according to the present disclosure from another angle, in which the joint structure is shown in an exploded view.
Figure 5B:
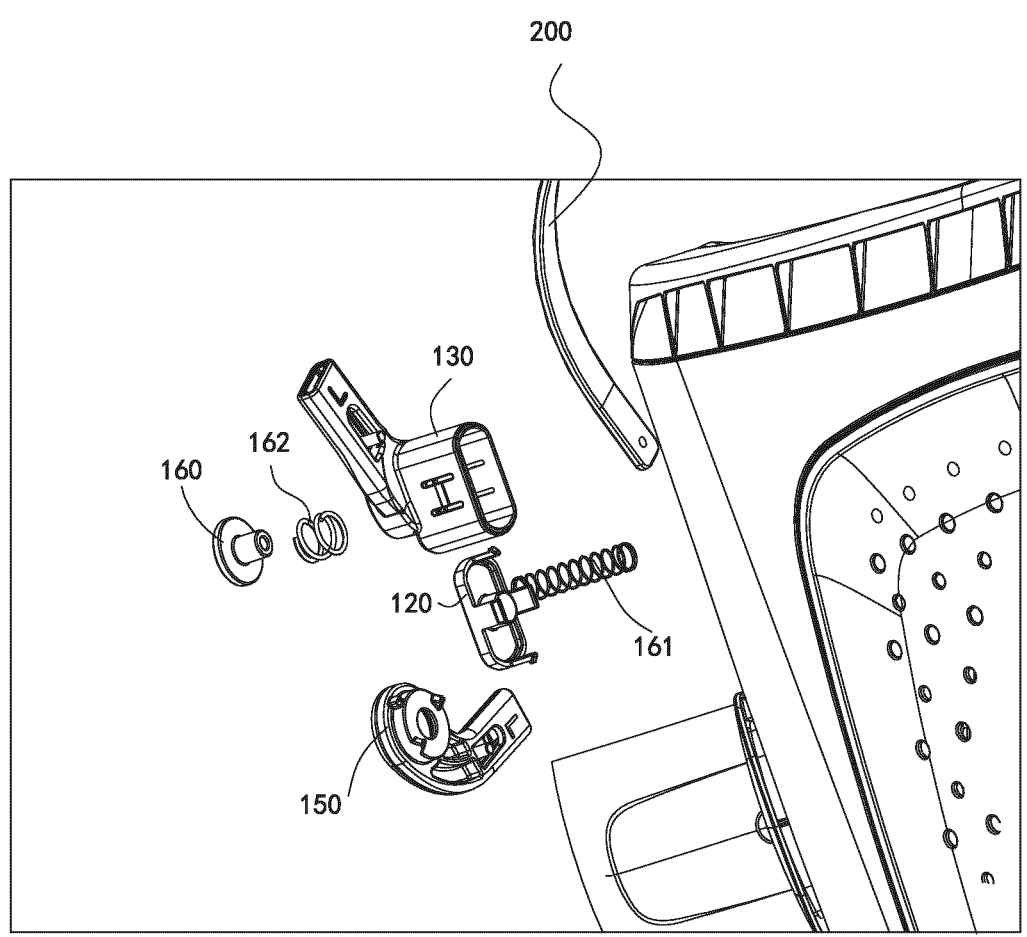
FIG. 5B is an enlarged view of a block portion of FIG. 5A.

The specific mechanism of the fixing part 110 will be described with reference to FIGS. 4B, 9B and 10B.

The fixing part 110 has a cylindrical fixing part side wall 112 that has an open end 1121 and a receiving end 1122 disposed opposite to each other. The cross section of the fixing part side wall 112 is a non-circular structure, for example, may be roughly presented in a rectangle having a pair of opposite sides that are arc-shaped edges. As such, when the inserting part 130 having a shape corresponding to that of the fixing part 110 is inserted into the fixing part 110, the rotation of the inserting part 130 in the fixing part 110 can be retrained. It should be understood that the cross-section of the fixing part side wall 112 may also be in other shapes, for example square, trapezoid, oval, and the like.

The fixing part 110 also has a fixing part edge 111 that extends outwardly from an edge of the open end 1121 of the fixing part side wall 112. The fixing part edge 111 is provided to facilitate fixing the fixing part 110 onto the seat body 300 and can modify an appearance of the fixing part 110. In one embodiment, the fixing part edge 111 extends in a flipped manner from the open end 1121 of the fixing part side wall 112 toward the receiving end 1122, to facilitate fixing the fixing part 110 to the seat body 300, and forming a good transition and engagement between the fixing part 110 and the seat body 300.

A direction from the open end 1121 of the fixing part side wall 112 to the receiving end 1122 is referred as an insertion direction. In this insertion direction, the cross-section of the fixing part side wall 112 is substantially uniform. A stopper 114 is provided on an inner side of the fixing part side wall 112, and is located between the open end 1121 and the receiving end 1122 and protrudes inwardly from the inner side of the fixing part side wall 112. The stopper 114 may be close to the open end 1121, for example, a distance from stopper 114 to the open end 1121 in the insertion direction is approximately ½ to ⅓ of a total length of the fixing part 110.

Figure 6A:
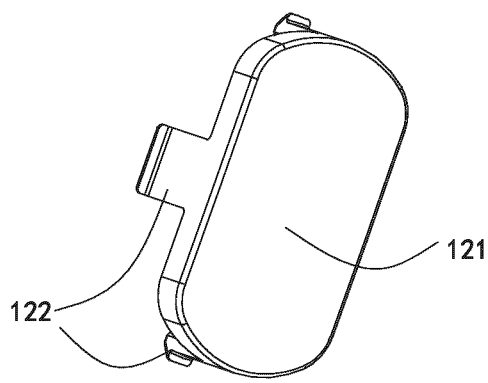
FIGS. 6A and 6B are two perspective views of a closing member viewed from different angles, respectively.
Figure 6B:
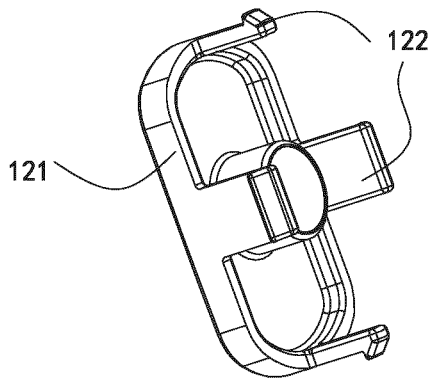

The specific structure of the closing member 120 will be described with reference to FIGS. 6A-6B.

The closing member 120 is a member that is positioned inside the fixing part side wall 112 and is movable between the open end 1121 and the receiving end 1122. The closing member 120 has a closing plate 121 at a position adjacent to the open end 1121, and a shape of the closing plate 121 corresponds to the cross-sectional shape of the fixing part side wall 112 at the open end 1121. In the embodiments as shown in FIGS. 6A-6B, the closing member 120 is generally plate-shaped. However, it should be understood that the closing member 120 can be in any suitable shapes, such as a block shape and a cone shape, as long as the closing plate 121 suitable for closing the open end 1121 is provided.

In one embodiment, the closing member 120 is provided with a barb 122 that extends from the closing plate 121 toward the receiving end 1122 and has a hook portion protruding toward the fixing part side wall 112 at an bottom end. The barb 122 is adapted to snap onto the stopper 114 of the fixing part side wall 112. When the closing member 120 is biased by the first elastic member 161 to the open end 1121, the barb 122 abuts against the stopper 114 from a side adjacent to the receiving end 1122 to prevent the disengagement of the closing member 120 from the fixing part 110. In one embodiment, the closing member 120 has a plurality of barbs 122 that are provided to correspond to the stoppers 114 on long and/or short sides of the fixing part side wall 112, respectively. In other embodiments, the closing member 120 may be blocked and positioned in other manners, for example, the cross section of the open end 1121 is configured to be smaller than that of the closing plate 121 to prevent the disengagement of the closing member 120 from the fixing part 110.

Figure 7A:
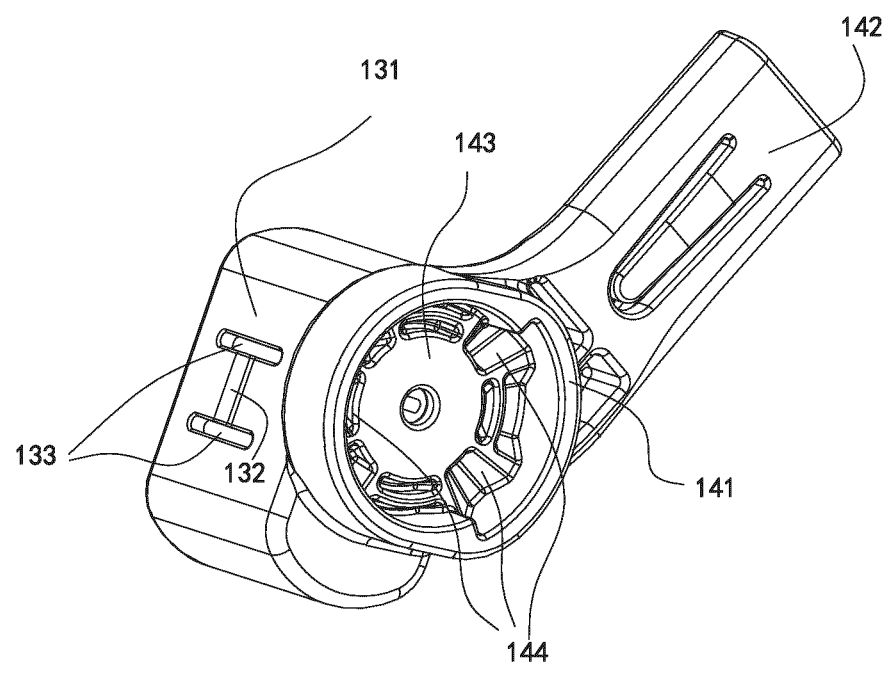
FIGS. 7A and 7B are two perspective views of a inserting part and a first canopy rod fixing member viewed from different angles, respectively.
Figure 7B:
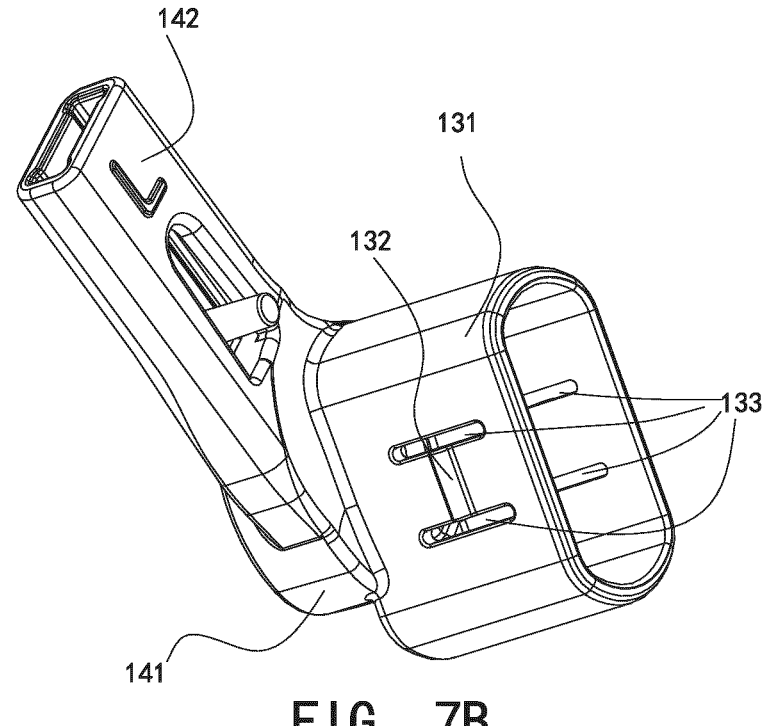

The specific structures of the inserting part 130 and the first canopy rod fixing member 140 will be described with reference to FIGS. 7A-7B.

It should be understood that the inserting part 130 in the present disclosure is assembled to the first canopy rod fixing member 140, the inserting part 130 of the present disclosure may be applied to different objects.

The inserting part 130 has a cylindrical inserting part side wall 131 so that the inserting part 130 can be inserted and sleeved into the fixing part side wall 112 through the open end 1121 along an insertion direction. A protruding part 132 is provided on an outer side of the inserting part side wall 131, and protrudes outwardly from the outer side of the inserting part side wall 131. When the inserting part 130 is inserted into the fixing part 110, the protruding part 132 travels over the stopper 114 and abuts against the stopper 114 from a side adjacent to the receiving end 1122 to prevent the disengagement of the inserting part 130 from the fixing part 110.

In one embodiment, the inserting part side wall 131 has a plurality of protruding parts 132 that respectively correspond to the stoppers 114 on the long and/or short sides of the fixing part side wall 112. This design allows all sides of the inserting part 130 to be locked in the fixing part 110, thereby increasing stability of the canopy 200.

In one embodiment, the protruding part 132 extends on the inserting part side wall 131 along a direction perpendicular to the insertion direction, and slots 133 parallel to the insertion direction are provided on the inserting part side wall 131 at both ends of the protruding part 132 respectively. Such design allows the protruding part 132 to be depressed by virtue of elastic deformation, to travel over the stopper 114 easily during the insertion of the inserting part 130. Moreover, when the user intends to pull out the inserting part 130, the protruding part 132 can disengage from the fixing part 110 by travelling over the stopper 114 only with minimal force exerted by the user.

It should be understood that the inserting part 130 may be fixed to the fixing part 110 by different ways, such as a snap fit, a friction fit, or the like, in other embodiments.

The first canopy rod fixing member 140 is attached to an outer surface of the inserting part 130 in the insertion direction. In this way, when the inserting part 130 is completely inserted into the fixing part 110, the first canopy rod fixing member 140 approaches a side surface of the seat body 300 and partially shields the joint structure 100, so that the entire joint structure 100 has a few to be exposed outside, and a neat appearance can be formed. In this embodiment, the first canopy rod fixing member 140 and the inserting part 130 are formed as one component. It should be understood that the first canopy rod fixing member 140 and the inserting part 130 may be respectively formed as separate components in other embodiments.

The first canopy rod fixing member 140 includes a first disc-shaped part 141 and a first canopy rod connection 142. The first disc-shaped part 141 is provided on a side of the inserting part 130. The first canopy rod connection 142 has one end that is connected to an outer circumference of the first disc-shaped part 141, and the other end that extends obliquely and upwardly toward the child safety seat and is connected to one end of the U-shaped first canopy rod 210. A center of the first disc-shaped part 141 is a hollow receiving space 143 for receiving at least part of the second canopy rod fixing member 150, the second elastic member 162, and the cap 160. A plurality of positioning grooves 144 are formed on a circumferential inner wall of the receiving space 143, for rotational positioning between the second canopy rod fixing member 150 and the first canopy rod fixing member 140.

Figure 8A:
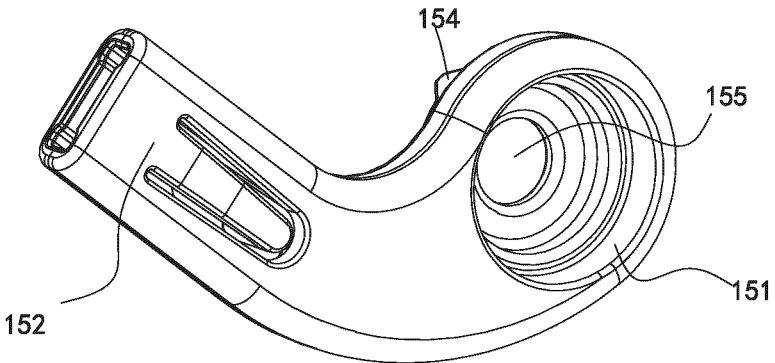
FIGS. 8A and 8B are two perspective views of a second canopy rod fixing member viewed from different angles, respectively.
Figure 8B:
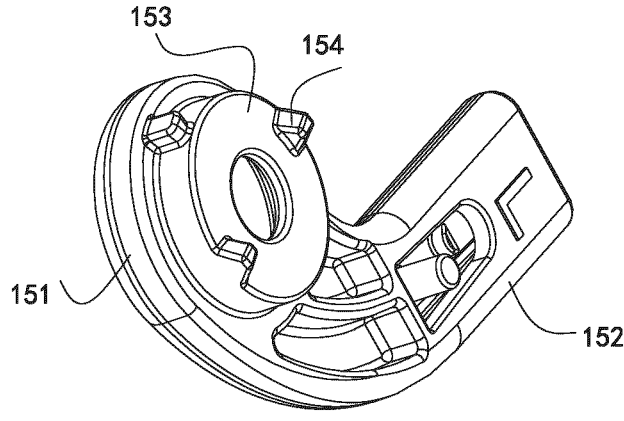

The second canopy rod fixing member 150 will be described in detail with reference to FIGS. 8A-8B.

The second canopy rod fixing member 150 includes a second disc-shaped part 151 and a second canopy connection 152. The second disc-shaped part is rotatably attached to the first canopy rod fixing member 140. The second canopy connection 152 has one end that is connected to an outer circumference of the second disc-shaped part 151, and the other end that extends obliquely and forwardly toward the child safety seat and is connected to one end of the U-shaped second canopy rod 220. A rotating part 153 is provided on a side of the second disc-shaped part 151 facing the first disc-shaped part 141, and the rotating part 153 has a size approximately corresponding to the receiving space 143 of the first disc-shaped part 141 so as to be rotatably received in the receiving space 143. A positioning protrusion 154 is provided on the outer circumference of the rotating part 153, and corresponds to the positioning groove 144 on the circumferential inner wall of the receiving space 143, so that the second canopy rod fixing member 150 can be positioned at several specific angular positions with respect to the first canopy rod fixing member 140. A through hole 155 is opened in the center of the rotating part 153 so that a portion of the cap 160 is connected to the first canopy rod fixing member 140 through the through hole 155 of the second canopy rod fixing member 150 so as to form a rotational connection between the second canopy rod fixing member 150 and the first canopy rod fixing member 140.

A second elastic member 162, for example a torsion spring is provided between the second disc-shaped part 151 and the first disc-shaped part 141, and biases the first canopy rod fixing member 140 and the second canopy rod fixing member 150 to pivot toward a closing direction. The arrangement of the second elastic member 162 has been known in the art and will not be discussed here.

Specifically, the assembly of the child safety seat according to the present disclosure will be described with reference to FIGS. 9A-10B.

Figure 9A:
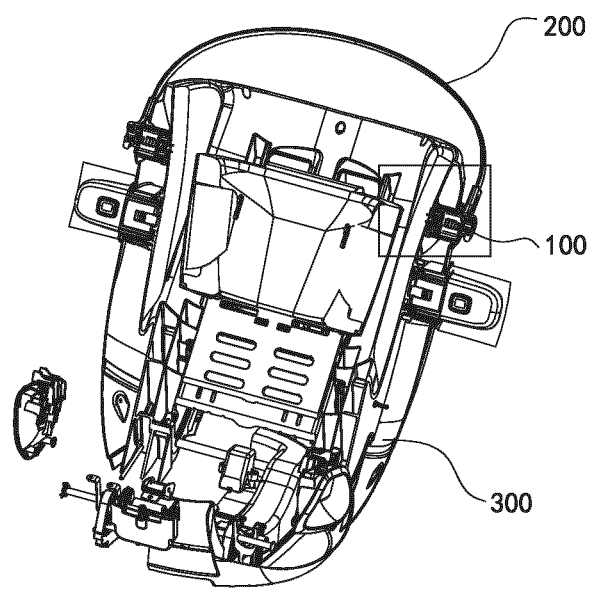
FIG. 9A is a cross-sectional view taken along line A-A in FIG. 1.
Figure 9B:
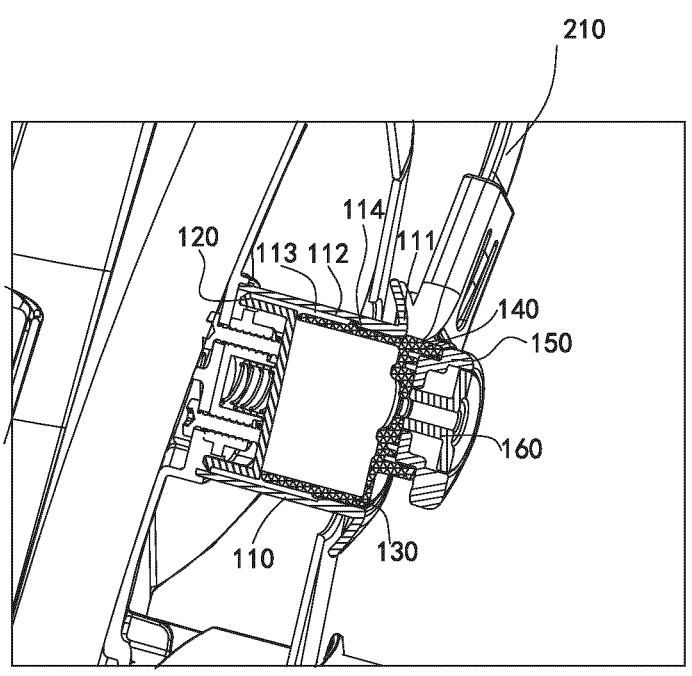
FIG. 9B is a partial enlarged view of the block portion in FIG. 9A.

In states as shown in FIGS. 9A-9B, the inserting part 130 has been inserted into the fixing part 110. Meanwhile, the protruding part 132 on the outer wall of the inserting part 130 is engaged with the stopper 114 provided on the inner side of the fixing part 110 from one side adjacent to the receiving end 1122, so that the inserting part 130 is kept inside the fixing part 110. The closing member 120 is pressed by the inserting part 130, and moves to the vicinity of the receiving end 1122 on the fixing part side wall against a biasing force of the first elastic member 161. The first canopy rod fixing member 140 (and the first canopy rod 210 mounted thereon) approaches the side surface of the seat body 300.

Figure 10A:
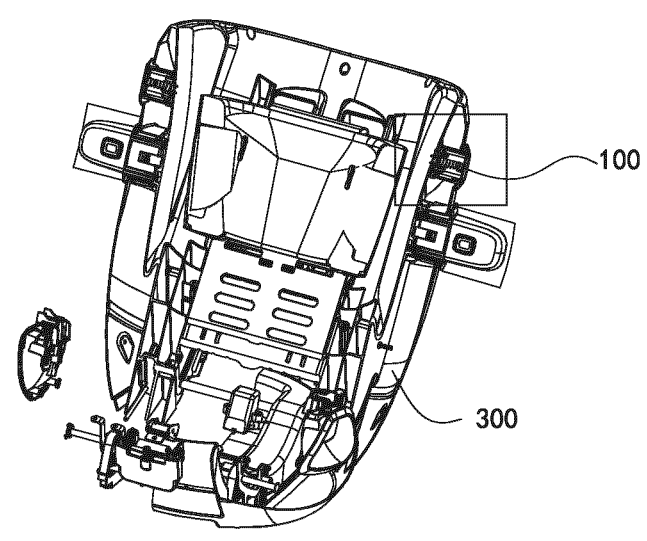
FIG. 10A is a cross-sectional view taken along line B-B in FIG. 2.
Figure 10B:
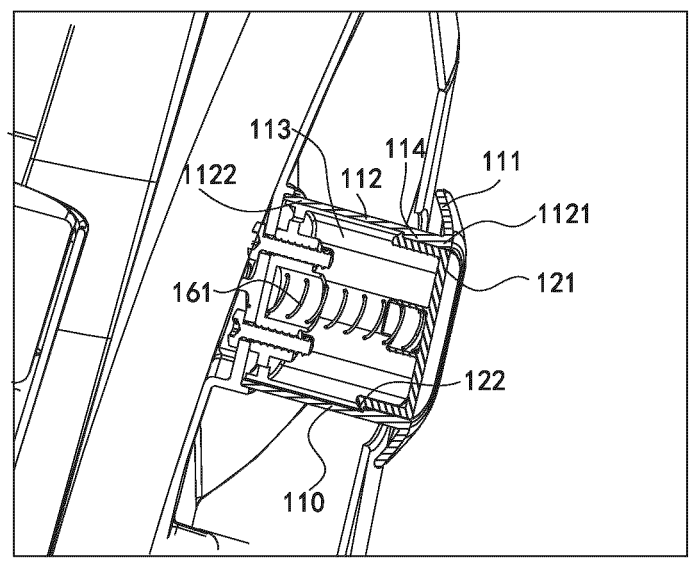
FIG. 10B is a partial enlarged view of a block portion in FIG. 10A.
Figure 11A:
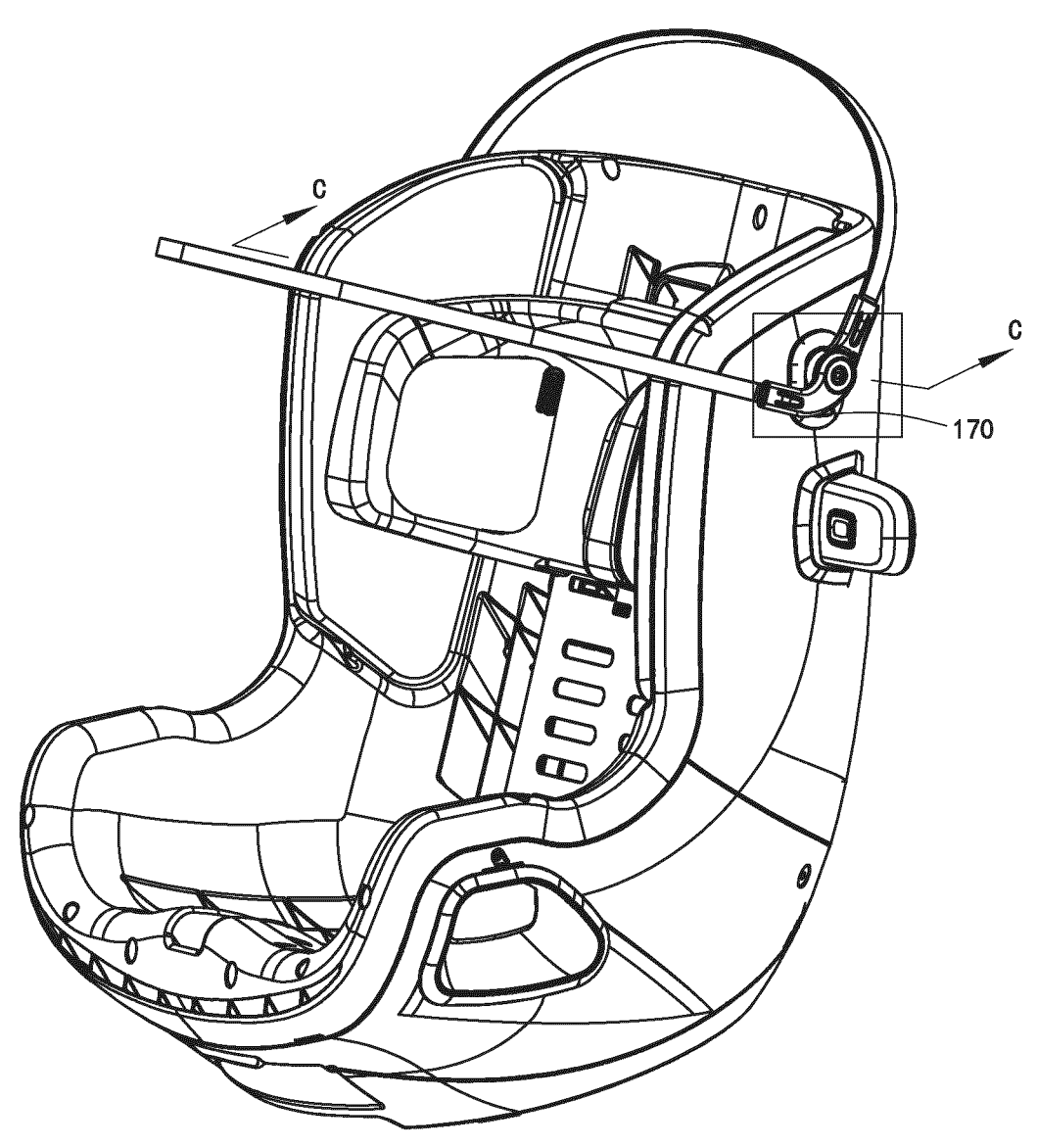
FIG. 11A is a perspective view of another embodiment of a joint structure according to the present disclosure.
Figure 11B:
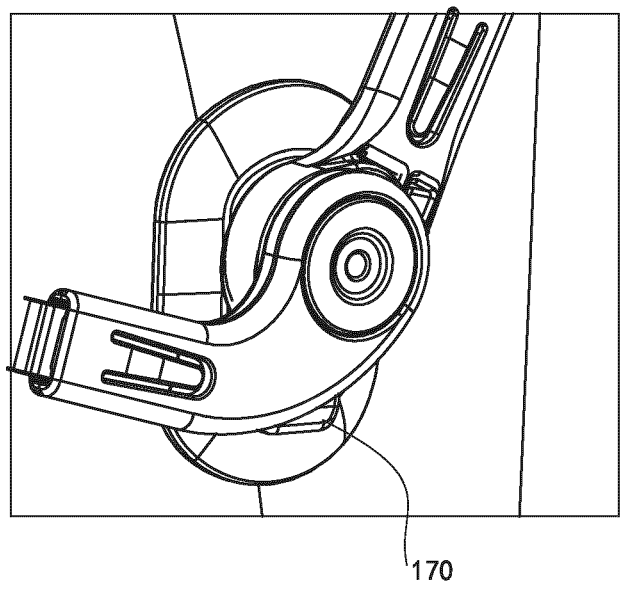
FIG. 11B is a partial enlarged view of a block portion of FIG. 11A.
Figure 11C:
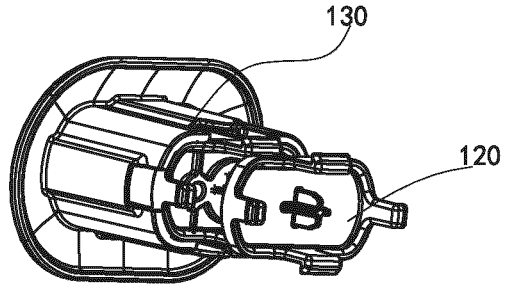
FIG. 11C is a perspective view of a closing member and a inserting part on an opposite side of the block portion in FIG. 11A.
Figure 12A:
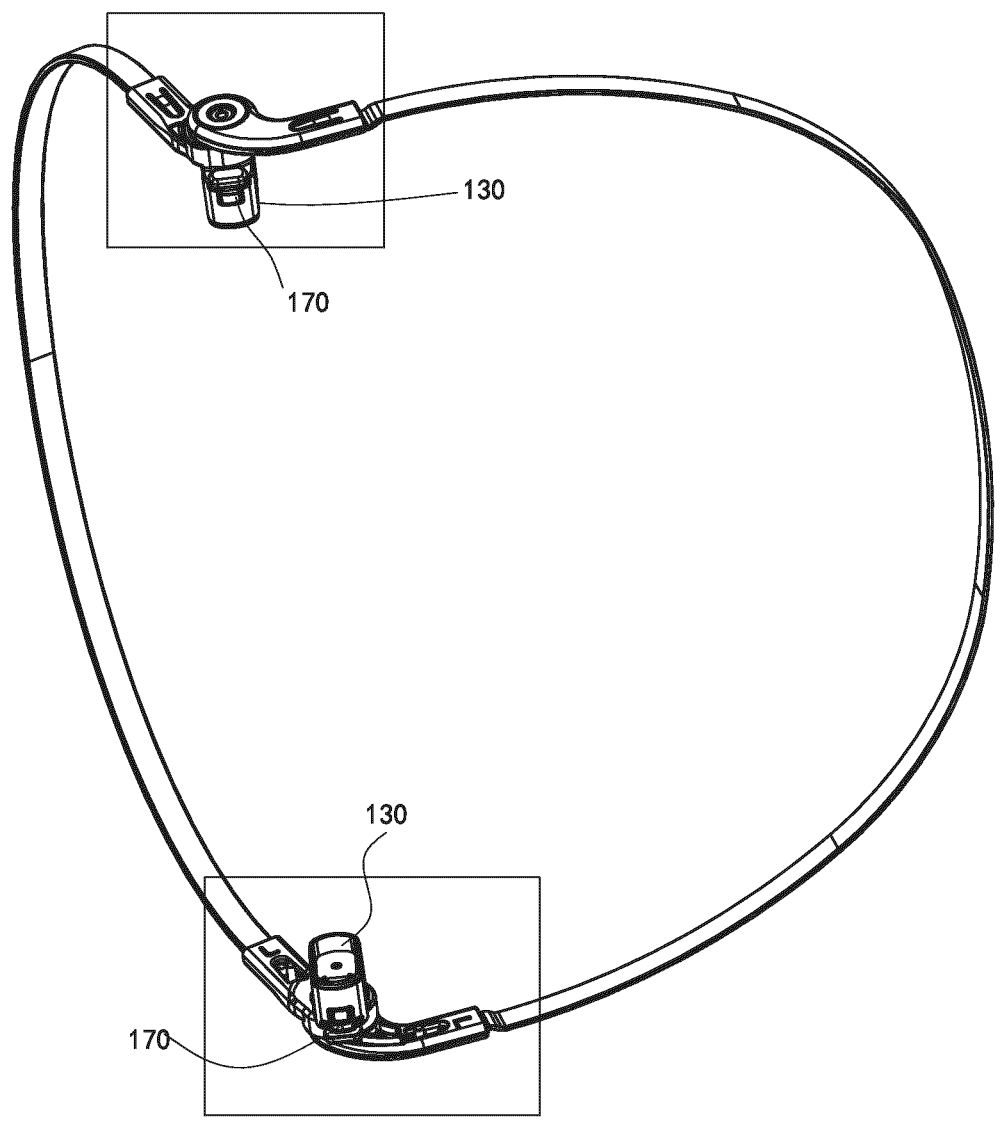
FIG. 12A is a perspective view of a joint structure and a canopy rod in FIG. 11A, in which the canopy rod is in an open state.
Figure 12B:
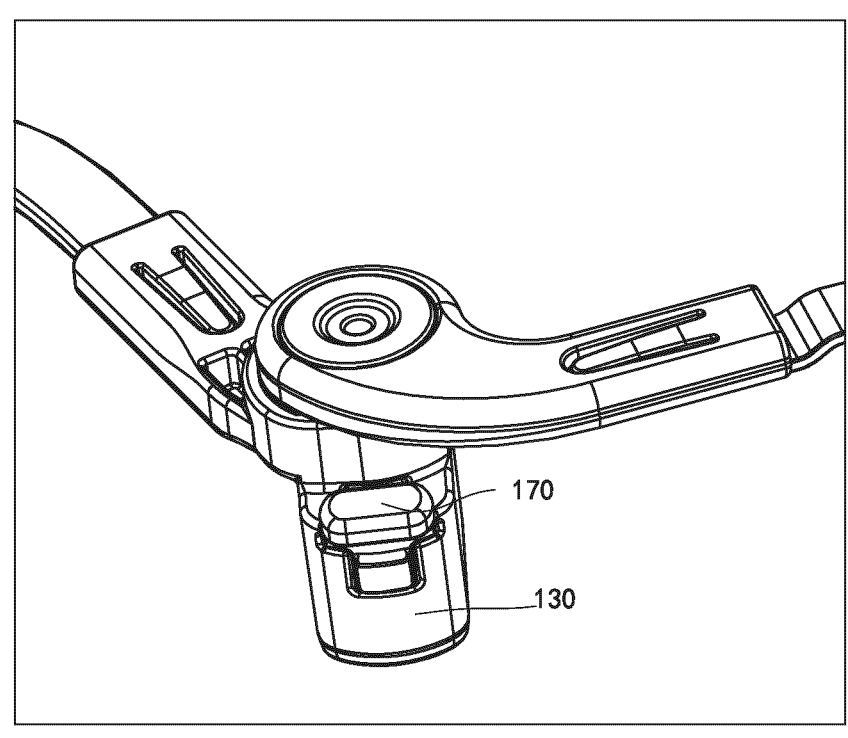
FIGS. 12B and 12C are partial enlarged views of upper and lower blocks in FIG. 12A, respectively.
Figure 12C:
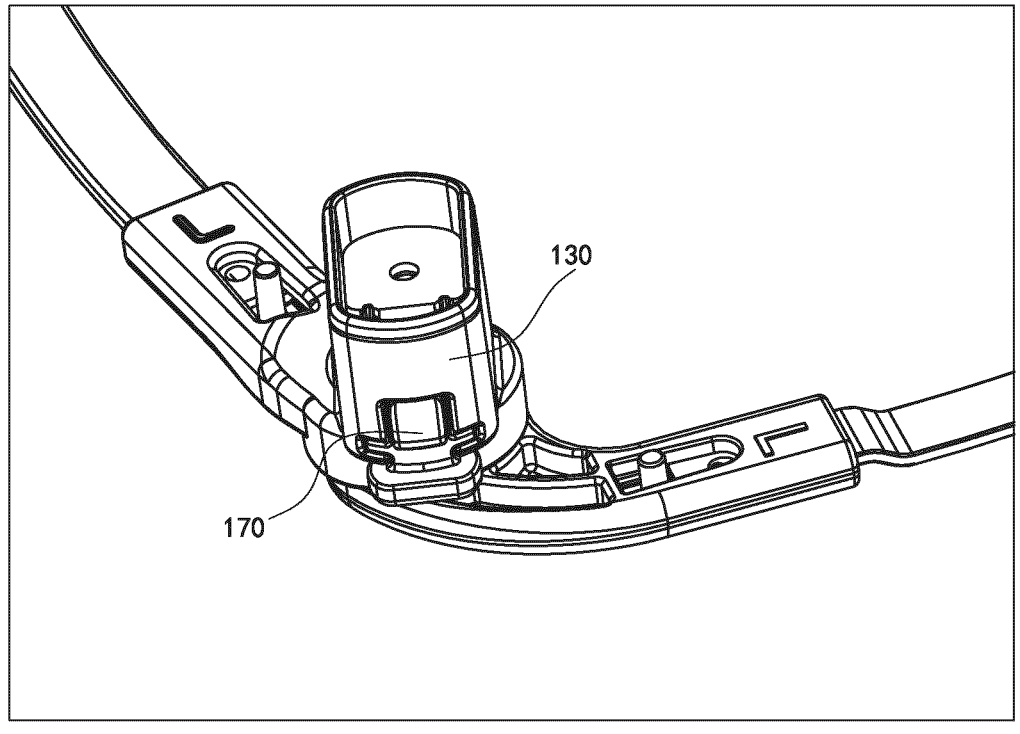
Figure 13A:
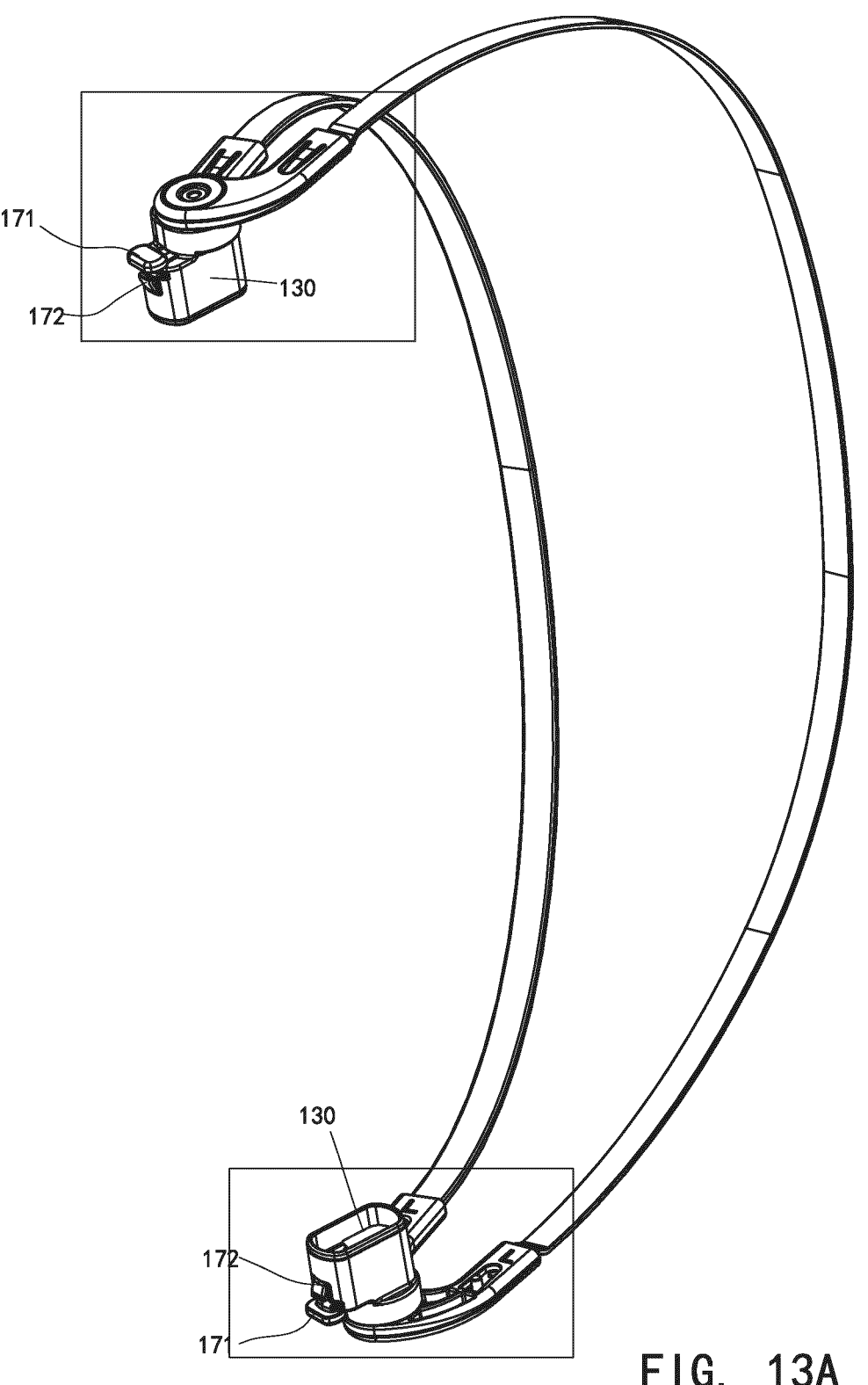
FIG. 13A is a perspective view of the joint structure and the canopy rod in FIG. 11A, in which the canopy rod is in a closed state.
Figure 13B:
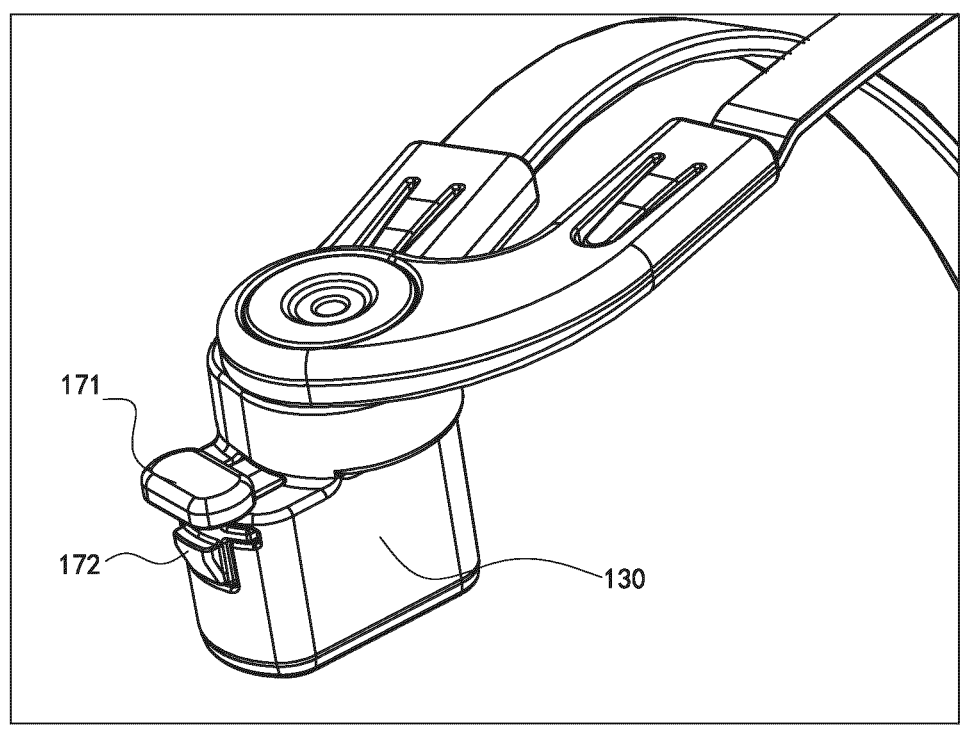
FIGS. 13B and 13C are partial enlarged views of upper and lower blocks in FIG. 13A, respectively.
Figure 13C:
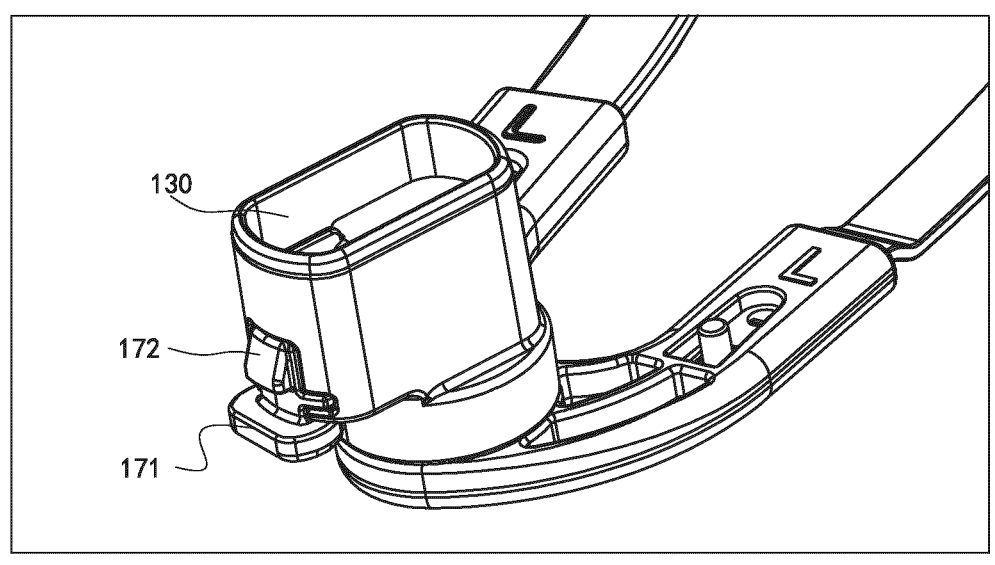
Figure 14A:
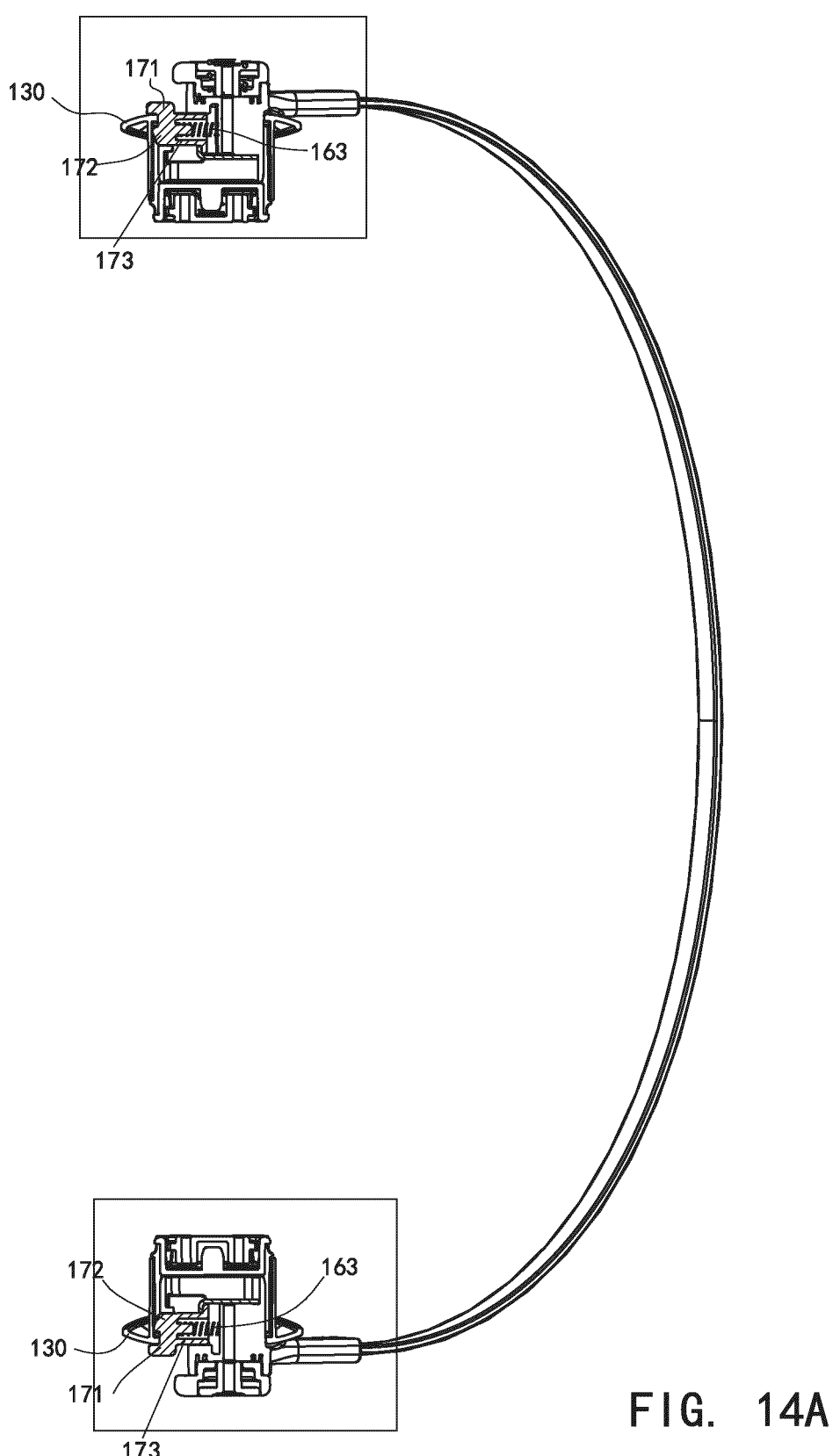
FIG. 14A is a cross-sectional view taken along line C-C of FIG. 11A, from which the seat body is omitted.
Figure 14B:
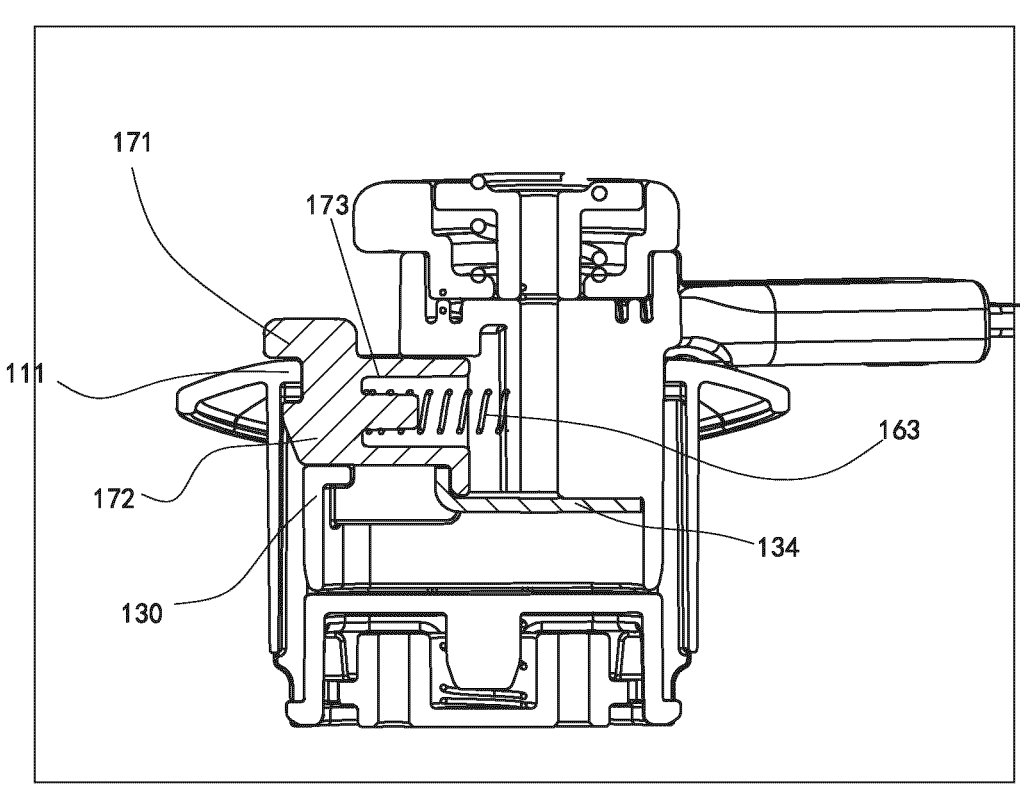
FIGS. 14B and 14C are partial enlarged views of upper and lower blocks in FIG. 14A, respectively.
Figure 14C:
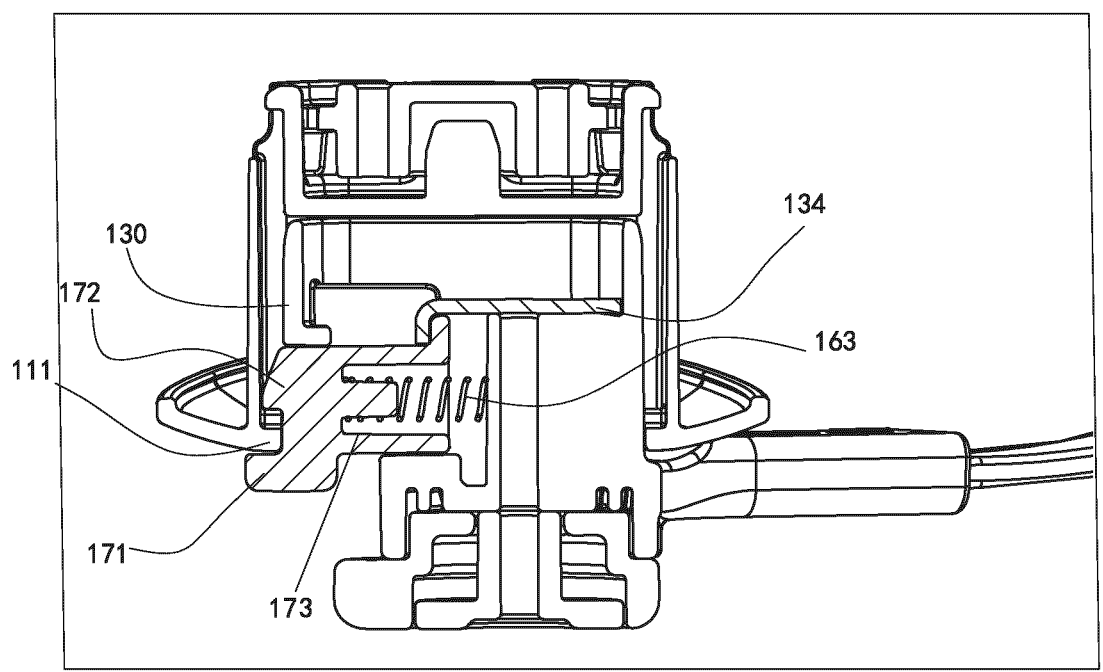

In states as shown in FIGS. 10A-10B, the inserting part 130 has been pulled out of the fixing part 110, and the canopy rod has been removed accordingly. Meanwhile, the closing member 120 is biased by the first elastic member 161 and moves to the open end 1121 of the fixing part 110. The barb 122 of the closing member 120 is engaged with the stopper 114 provided on the inner side of the fixing part 110 from the side adjacent to the receiving end 1122, so that the closing member 120 is kept inside the fixing part 110. The closing member 120 is sized that the closing plate 121 is just flush with the open end 1121 when the barb 122 is engaged with the stopper 114. In this way, the closing plate 121 closes the open end 1121 of the fixing part side wall 112.

Another embodiment of the joint structure according to the present disclosure will be described with reference to FIGS. 11A to 14C. This embodiment is substantially the same as the preceding embodiment, except that the joint structure also has a release button 170. A function of the release button 170 is to facilitate separating the inserting part 130 from the fixing part 110.

The release button 170 is provided on a side surface of the inserting part 130, and is partially inserted in the inserting part 130. More specifically, the release button 170 is slidable between a locked position away from the inserting part 130 and a release position close to the inserting part 130 in a generally up-down direction (i.e., perpendicular to the insertion direction of the inserting part 130).

The release button 170 is provided with a pushing portion 171 and a locking portion 172 on a side thereof away from the inserting part 130. The pushing portion 171 and the locking portion 172 are exposed outside the inserting part 130, both of which protrude outwardly in a direction perpendicular to the insertion direction of the inserting part 130, and the locking portion 172 is closer to the fixing part 110 than the pushing portion 171. A release button elastic member mount 173 is provided on a side of the release button 170 toward the inserting part 130. The third elastic member 163 in a form of a spring has one end that is fixed on the release button elastic member mount 173, and the other end that abuts against the inside of the inserting part 130, to bias the release button 170 against the locked position. A limiting portion 134 is also provided in the inserting part 130 to prevent the movement and the disengagement of the release button 170 from the inserting part 130.

In this way, when the inserting part 130 is inserted into the fixing part 110, the pushing portion 171 remains outside the fixing part 110, and the locking portion 172 is inserted into the fixing part 110 and is snapped on the inner side of the edge of the fixing part 110. Therefore, the release button 170 can hold the inserting part 130 in the fixing part 110. When the user intends to release the fixing part 110, the inserting part 130 can be easily separated from the fixing part 110 only by pushing the pushing portion 171 toward the inserting part 130.

In the embodiment in which the release button 170 is provided, it is unnecessary to arrange the protruding part 132 and the slot 133 on the inserting part 130.

As above described, the present disclosure provides a joint structure 100, which can easily engage the seat body 300 of the child safety seat with the canopy 200, and in which significant holes are not presented when the canopy 200 is removed. According to the joint structure 100 of the present disclosure, regardless of installing the canopy 200, the child safety seat can be provided with a generally neat appearance. Moreover, the joint structure 100 of the present disclosure is not limiting portioned to be applied to a child safety seat, and can also be used to join any two objects.

As the present disclosure may be embodied in a variety of forms without departing from the spirit or scope of the present disclosure, it should be understood that the above-described embodiments are not limiting portioned to any foregoing details. All changes and modifications within the scope of the claims or their equivalents are intended to be embraced by the appended claims.

What is claimed is:

1. A joint structure for detachably joining a first object to a second object, comprising:

a fixing part connected to the first object, the fixing part having a cylindrical fixing part side wall, and the fixing part side wall having an open end and a receiving end provided opposite to each other;

an inserting part connected to said second object, the inserting part having a cylindrical inserting part side wall, and the inserting part being inserted and sleeved into the fixing part side wall along an insertion direction through the open end, such that the second object is jointed to the first object;

a closing member provided inside the fixing part side wall, positioned between the receiving end of the fixing part and the inserting part, and being movable between the open end and the receiving end; the closing member having a closing plate adjacent to the open end, and the closing plate being shaped corresponding to a cross-sectional shape of the fixing part side wall at the open end; and a first elastic member provided between the closing member and the receiving end, for exerting a force that bias the closing member toward the open end, such that the closing member elastically abuts against the inserting part, wherein when the inserting part is not inserted into the fixing part, the closing member is biased to the open end by the first elastic member, and when the inserting part is inserted into the fixing part, the closing member is pushed to the receiving end by the inserting part and leaves the open end;

at least one stopper provided on an inner side of the fixing part side wall, the at least one stopper being positioned between the open end and the receiving end, wherein the at least one stopper protrudes inwardly from the inner side of the fixing part side wall; and at least one protruding part provided on an outer side of the inserting part side wall, wherein the at least one protruding part protrudes outwardly from the outer side of the inserting part side wall, and when the inserting part is inserted into the fixing part, the at least one protruding part travels over the at least one stopper and abuts against the at least one stopper from a side adjacent to the receiving end, to prevent disengagement of the inserting part from the fixing part.

2. The joint structure according to claim 1, wherein:

the at least one stopper is a plurality of stoppers formed in a circle along an inner circumference of the fixing part side wall, or the at least one stopper is a plurality of stoppers symmetrically provided on the inner circumference of the fixing part side wall in a discrete manner.

3. The joint structure according to claim 2, wherein:

a cross section of the fixing part side wall is substantially presented as a rectangle, and the at least one stopper is a plurality of stoppers provided on each of long sides and short sides of the rectangle; and the at least one protruding part is a plurality of protruding parts provided on the inserting part side wall, and respectively correspond to the plurality of stoppers on the long sides and/or the short sides of the fixing part side wall; and the closing member has a plurality of barbs that are configured to correspond to the plurality of stoppers on the long sides and/or the short sides of the fixing part side wall.

4. The joint structure according to claim 2, wherein:

the closing member is provided with a barb that extends from the closing plate toward the receiving end and has a hook portion protruding toward the fixing part side wall at a bottom end; and the barb is configured to abut against the at least one stopper from the side adjacent to the receiving end to prevent the disengagement of the closing member from the fixing part when the closing member is biased to the open end by the first elastic member.

5. The joint structure according to claim 2, wherein:

the at least one protruding part extends on the inserting part side wall in a direction perpendicular to the insertion direction, and a slot parallel to the insertion direction is provided on the inserting part side wall at either end of the at least one protruding part.

6. The joint structure according to claim 1, wherein:

the closing member is provided with a barb that extends from the closing plate toward the receiving end and has a hook portion protruding toward the fixing part side wall at a bottom end; and the barb is configured to abut against the at least one stopper from the side adjacent to the receiving end to prevent the disengagement of the closing member from the fixing part when the closing member is biased to the open end by the first elastic member.

7. The joint structure according to claim 1, wherein:

the at least one protruding part extends on the inserting part side wall in a direction perpendicular to the insertion direction, and a slot parallel to the insertion direction is provided on the inserting part side wall at either end of the at least one protruding part.

8. The joint structure according to claim 1, wherein:

the fixing part further has a fixing part edge that extends outwardly from an edge of the open end of the fixing part side wall; and when the inserting part is not inserted into the fixing part, a closing plate of the closing member is substantially flush with the fixing part edge.

9. The joint structure according to claim 1, wherein:

in the insertion direction of the inserting part, a sum of lengths of the inserting part and the closing member is approximately equal to a length of the fixing part, such that the closing member abuts against the receiving end of the fixing part when the inserting part is inserted into the fixing part.

10. A joint structure for detachably joining a first object to a second object, comprising:

a fixing part connected to the first object, the fixing part having a cylindrical fixing part side wall, and the fixing part side wall having an open end and a receiving end provided opposite to each other;

an inserting part connected to said second object, the inserting part having a cylindrical inserting part side wall, and the inserting part being inserted and sleeved into the fixing part side wall along an insertion direction through the open end, such that the second object is jointed to the first object;

a closing member provided inside the fixing part side wall, positioned between the receiving end of the fixing part and the inserting part, and being movable between the open end and the receiving end; the closing member having a closing plate adjacent to the open end, and the closing plate being shaped corresponding to a cross-sectional shape of the fixing part side wall at the open end;

a first elastic member provided between the closing member and the receiving end, for exerting a force that bias the closing member toward the open end, such that the closing member elastically abuts against the inserting part, wherein when the inserting part is not inserted into the fixing part, the closing member is biased to the open end by the first elastic member; and when the inserting part is inserted into the fixing part, the closing member is pushed to the receiving end by the inserting part and leaves the open end; and a release button provided on the inserting part side wall and partially inserted in the inserting part, wherein the release button is slidable between a locked position away from the inserting part and a release position close to the inserting part in a direction perpendicular to the insertion direction of the inserting part, so as to selectively lock the inserting part to the fixing part.

11. The joint structure according to claim 10, wherein:

the release button comprises:

a pushing portion protruding outwardly at a side away from the fixing part and perpendicular to the insertion direction of the inserting part; and a locking portion protruding outwardly at the side away from the fixing part and perpendicular to the insertion direction of the inserting part, and is closer to the fixing part than the pushing portion; and when the inserting part is inserted into the fixing part, the pushing portion remains outside the fixing part, and the locking portion is inserted into the fixing part and is snapped on an inner side of a stopper of the fixing part.

12. The joint structure according to claim 10, wherein:

in the insertion direction of the inserting part, a sum of lengths of the inserting part and the closing member is approximately equal to a length of the fixing part, such that the closing member abuts against the receiving end of the fixing part when the inserting part is inserted into the fixing part.

13. The joint structure according to claim 10, wherein:

the fixing part further has a fixing part edge that extends outwardly from an edge of the open end of the fixing part side wall; and when the inserting part is not inserted into the fixing part, a closing plate of the closing member is substantially flush with the fixing part edge.

14. A child safety seat, comprising:

a seat body;

a canopy configured to join to an upper part of the seat body; and two joint structures respectively provided on both sides of the seat body for detachably joining a first object to a second object, the first object being the seat body and the second object being the canopy, wherein each of the two joint structures comprises:

a fixing part connected to the first object, the fixing part having a cylindrical fixing part side wall, and the fixing part side wall having an open end and a receiving end provided opposite to each other, the receiving end of the fixing part being embedded into the seat body from a corresponding side surface of the seat body, and the open end of the fixing part being exposed out of a corresponding side surface of the seat body;

an inserting part connected to said second object, the inserting part having a cylindrical inserting part side wall, and the inserting part being inserted and sleeved into the fixing part side wall along an insertion direction through the open end, such that the second object is jointed to the first object;

a closing member provided inside the fixing part side wall, positioned between the receiving end of the fixing part and the inserting part, and being movable between the open end and the receiving end; the closing member having a closing plate adjacent to the open end, and the closing plate being shaped corresponding to a cross-sectional shape of the fixing part side wall at the open end; and a first elastic member provided between the closing member and the receiving end, for exerting a force that bias the closing member toward the open end, such that the closing member elastically abuts against the inserting part, wherein when the inserting part is not inserted into the fixing part, the closing member is biased to the open end by the first elastic member; and when the inserting part is inserted into the fixing part, the closing member is pushed to the receiving end by the inserting part and leaves the open end;

the canopy comprises a first canopy rod and a second canopy rod that are substantially U-shaped, each of the two joint structures comprises a first canopy rod fixing member and a second canopy rod fixing member, wherein the first canopy rod fixing member is fixed on the inserting part, and the second canopy rod fixing member is pivotally connected to the first canopy rod fixing member; and two ends of the first canopy rod are fixedly connected to the corresponding first canopy rod fixing members of the two joint structures, respectively, and two ends of the second canopy rod are fixedly connected to the corresponding second canopy rod fixing members of the two joint structures, respectively, so that the second canopy rod is rotatable about an axis parallel to the insertion direction of the inserting part with respect to the first canopy rod.

15. The child safety seat according to claim 14, wherein each of the two joint structures further comprises:

at least one stopper provided on an inner side of the fixing part side wall, wherein the at least one stopper is positioned between the open end and the receiving end and protrudes inwardly from the inner side of the fixing part side wall; and at least one protruding part provided on an outer side of the inserting part side wall, wherein the at least one protruding part protrudes outwardly from the outer side of the inserting part side wall, and when the inserting part is inserted into the fixing part, the at least one protruding part travels over the at least one stopper and abuts against the at least one stopper from a side adjacent to the receiving end, to prevent disengagement of the inserting part from the fixing part.

16. The child safety seat according to claim 14, wherein each of the two joint structures further comprises:

a release button provided on the inserting part side wall and partially inserted in the inserting part, wherein the release button is slidable between a locked position away from the inserting part and a release position close to the inserting part in a direction perpendicular to the insertion direction of the inserting part, so as to selectively lock the inserting part to the fixing part.

17. The child safety seat according to claim 14, wherein, for each of the two joint structures:

the fixing part further has a fixing part edge that extends outwardly from an edge of the open end of the fixing part side wall; and when the inserting part is not inserted into the fixing part, a closing plate of the closing member is substantially flush with the fixing part edge.

18. The child safety seat according to claim 14, wherein, for each of the two joint structures:

in the insertion direction of the inserting part, a sum of lengths of the inserting part and the closing member is approximately equal to a length of the fixing part, such that the closing member abuts against the receiving end of the fixing part when the inserting part is inserted into the fixing part.

* * * * *